US009332189B2

(12) United States Patent
Penov et al.

(10) Patent No.: US 9,332,189 B2
(45) Date of Patent: May 3, 2016

(54) USER-GUIDED OBJECT IDENTIFICATION

(71) Applicant: Amazon Technologies, Inc., Reno, NV (US)

(72) Inventors: Francislav Petrov Penov, Kirkland, WA (US); Aaron Michael Donsbach, Seattle, WA (US); Geoffrey Scott Heller, Seattle, WA (US); Kenneth Mark Karakotsios, San Jose, CA (US); Daniel Bibireata, Seattle, WA (US); Kah Kuen Fu, Sunnyvale, CA (US); Richard Howard Suplee, III, Bainbridge Island, WA (US); Timothy Youngjin Sohn, Mountain View, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/587,830

(22) Filed: Dec. 31, 2014

(65) Prior Publication Data

US 2015/0189188 A1    Jul. 2, 2015

Related U.S. Application Data

(63) Continuation of application No. 14/231,552, filed on Mar. 31, 2014, now abandoned, which is a continuation of application No. 13/431,079, filed on Mar. 27, 2012, now Pat. No. 8,687,104.

(51) Int. Cl.
*H04N 5/232* (2006.01)
*G06K 9/32* (2006.01)
(Continued)

(52) U.S. Cl.
CPC ............. *H04N 5/23293* (2013.01); *G06K 9/32* (2013.01); *G06K 9/6202* (2013.01); *G06Q 30/0643* (2013.01)

(58) Field of Classification Search
CPC ................... H04N 5/223293; G06Q 30/0643; G06K 9/6202; G06K 9/32
USPC ........................................................ 348/333.03
See application file for complete search history.

(56) References Cited

U.S. PATENT DOCUMENTS 7,239,350 B2    7/2007  Ban
8,254,771 B2    8/2012  Nose
(Continued)

OTHER PUBLICATIONS

PCT International Search Report dated Jun. 10, 2013, International Application No. PCT/US2013/34165 filed Mar. 27, 2013, 2 pages.
(Continued)

*Primary Examiner* — Gevell Selby
(74) *Attorney, Agent, or Firm* — Polsinelli LLP

(57) ABSTRACT

A user attempting to obtain information about an object can capture image information including a view of that object, and the image information can be used with a matching or identification process to provide information about that type of object to the user. In order to narrow the search space to a specific category, and thus improve the accuracy of the results and the speed at which results can be obtained, the user can be guided to capture image information with an appropriate orientation. An outline or other graphical guide can be displayed over image information captured by a computing device, in order to guide the user in capturing the object from an appropriate direction and with an appropriate scale for the type of matching and/or information used for the matching. Such an approach enables three-dimensional objects to be analyzed using conventional two-dimensional identification algorithms, among other such processes.

20 Claims, 9 Drawing Sheets

(51) Int. Cl.
*G06K 9/62* (2006.01)
*G06Q 30/06* (2012.01)

(56) References Cited

U.S. PATENT DOCUMENTS

| | | |
|---|---|---|
| 2001/0041073 A1 | 11/2001 | Sorek et al. |
| 2002/0135483 A1 | 9/2002 | Merheim et al. |
| 2005/0219384 A1 | 10/2005 | Herberger et al. |
| 2007/0172151 A1 | 7/2007 | Gennetten et al. |
| 2008/0030599 A1 | 2/2008 | Stavely et al. |
| 2008/0131003 A1 | 6/2008 | Bober |
| 2009/0086047 A1 | 4/2009 | Suehiro |
| 2010/0157128 A1 | 6/2010 | Choi et al. |
| 2011/0043642 A1 | 2/2011 | Yu et al. |
| 2011/0058787 A1* | 3/2011 | Hamada .......... G11B 27/10 386/224 |
| 2011/0109759 A1 | 5/2011 | Abe |
| 2011/0184972 A1 | 7/2011 | Ard et al. |
| 2011/0311100 A1 | 12/2011 | Fan |

OTHER PUBLICATIONS

PCT International Written Opinion dated Jun. 10, 2013, International Application No. PCT/US2013/34165 filed Mar. 27, 2013, 5 pages.
USPTO Notice of Allowance dated Nov. 29, 2013, U.S. Appl. No. 13/431,079, filed Mar. 27, 2012, 10 pages.
USPTO Non-Final Office Action dated Jul. 8, 2013, U.S. Appl. No. 13/431,079, filed Mar. 27, 2012, 14 pages.
USPTO Non-Final Office Action dated Jun. 10, 2014, U.S. Appl. No. 14/231,552, filed Mar. 31, 2014, 6 pages.

* cited by examiner

USER-GUIDED OBJECT IDENTIFICATION

CROSS REFERENCE TO RELATED APPLICATION

This application is a Continuation of, and accordingly claims the benefit of, U.S. patent application Ser. No. 14/231,552, filed with the U.S. Patent and Trademark Office on Mar. 31, 2014, which is a continuation of U.S. patent application Ser. No. 13/431,079, filed with the U.S. Patent and Trademark Office on Mar. 27, 2012, assigned U.S. Pat. No. 8,687,104, which are hereby incorporated herein by reference.

BACKGROUND

Users are increasingly utilizing electronic devices to obtain various types of information. For example, a user wanting to obtain information about a book can capture an image of the cover of the book and upload that image to a book identification service for analysis. In many cases, the cover image will be matched against a set of two-dimensional images including views of objects from a particular orientation. While books are relatively easy to match, as a user will generally capture an image of the cover of the book with the cover relatively centered and upright in the image, other objects are not as straightforward. For example, an object such as a pair of boots might be imaged from several different orientations, with many of those orientations not matching the orientation of the stored image for that type or style of boot. Similarly, objects such as shirts typically have images stored that show the shirt flat on a surface, which can have a significantly different shape than when the shirt is being worn. Further, single two-dimensional images typically do not provide any information about dimension or scale, such that an image matching algorithm might not be able to determine the difference between a model airplane and the corresponding actual airplane. These differences in orientation, size, and shape, among other such differences, can prevent accurate matches from being located for various images captured by a user.

BRIEF DESCRIPTION OF THE DRAWINGS

Various embodiments in accordance with the present disclosure will be described with reference to the drawings, in which.

DETAILED DESCRIPTION

Figure 1:
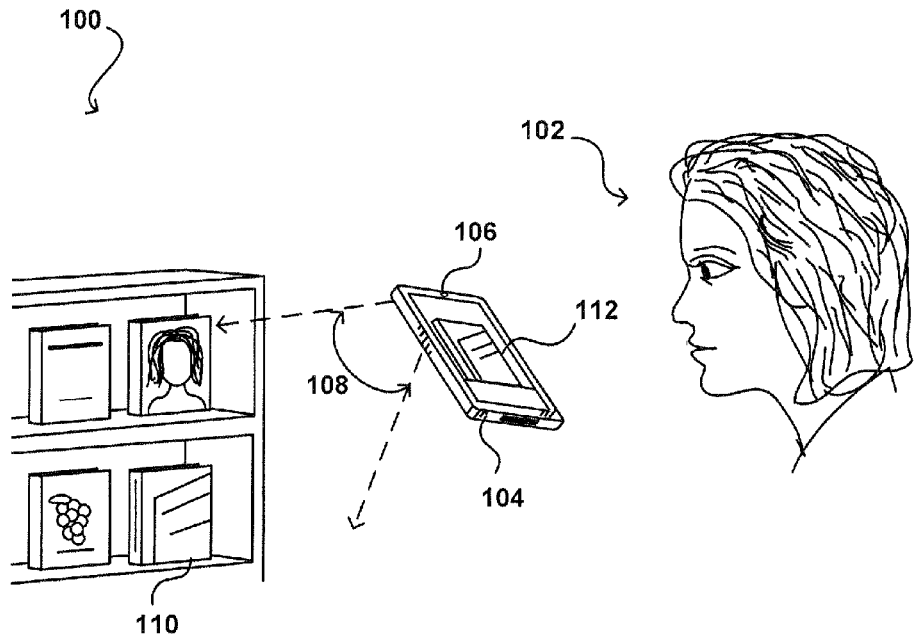
FIG. 1 illustrates an example environment in which aspects of the various embodiments can be that can be utilized.

Systems and methods in accordance with various embodiments of the present disclosure overcome one or more of the above-referenced and other deficiencies in conventional approaches to identifying various types of items or objects using an electronic device. In particular, various embodiments enable a user to capture image information (e.g., still images or video) about an object of interest and receive information about items that are determined to match that object based at least in part on the image information. Further, various embodiments can attempt to assist or guide a user in capturing images that show the object in an orientation that is likely to produce more accurate matching results. For example, a computing device can provide an outline or other orientation guide of a type of object to provide the user with a sense of the relative direction and distance the user should be from the object in order to capture an image that will have an orientation and scale that corresponds to objects of that type as stored in images in an image data store or other such location. In some embodiments, the user can select from a set of distinct outlines that correspond to the outline of a specific type of object, and the selected outline can help to narrow down the search space when attempting to locate a potential match. Further, various embodiments can prompt the user for additional information as necessary to attempt to narrow search categories or improve matching results for one or more objects in the captured image information. Embodiments also can allow for additional information to be captured and/or provided, such as by utilizing stereoscopic imaging with a stereo matching process, or by capturing and analyzing multiple frames using a multi-frame matching process.

In at least some embodiments, a computing device can communicate with at least one matching service in order to attempt to identify objects in the captured image information (although in some embodiments at least a portion of the matching can be done on the computing device itself). The device can upload, stream, or otherwise transfer image information (e.g., the captured image or data resulting from processing the image), either automatically or in response to user action, which can direct at least a portion of the image information to one or more image analysis services (or devices, or modules, etc.). Other types of data also can be supplied as well in some embodiments, as may include structured light data, three-dimensional information, distance data, light field camera data, wavefront coding data, and the like. An image analysis service can include one or more algorithms for matching image information image information stored for a variety of objects. The matching service can aggregate the results from the image analysis service(s), and can provide information about the results as a set of matches or results to be displayed to a user in response to an identify request. The matching service can also utilize one or more information aggregators or other such services that are capable of obtaining additional information for each of the results and provide that information to the user. The additional information can include, for example, descriptions, contact information, availability, location data, pricing information, and other such information.

Various other functions and advantages are described and suggested below as may be provided in accordance with the various embodiments.

FIG. 1 illustrates an example environment 100 in which aspects of the various embodiments can be implemented. In this example, a user 102 is in a store that sells books, and is interested in obtaining information about a book 110 of interest. Using an appropriate application executing on a computing device 104, the user is able to obtain an image of the book 110 by positioning the computing device such that the book is within a field of view 108 of at least one camera 106 of the computing device. Although a portable computing device (e.g., an electronic book reader, smart phone, or tablet computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, and portable media players, among others.

In this example, a camera 106 on the device 104 can capture image information including the book 110 of interest, and at least a portion of the image can be displayed on a display screen 112 of the computing device. At least a portion of the image information can be analyzed and, upon a match being located, identifying information can be displayed back to the user via the display screen 112 of the computing device 104. The portion of the image to be analyzed can be indicated manually, such as by a user pointing to the book on the screen or drawing a bounding box around the book. In other embodiments, one or more image analysis algorithms can attempt to automatically locate one or more objects in an image. In some embodiments, a user can manually cause image information to be analyzed, while in other embodiments the image information can be analyzed automatically, either on the device or by transferring image data to a remote system or service as discussed later herein.

Figure 2:
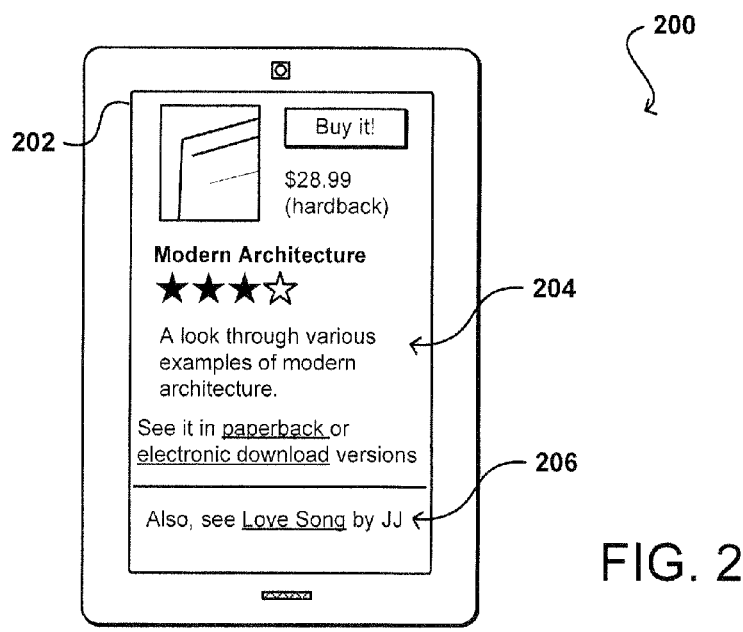
FIG. 2 illustrates example display that can be presented in accordance with various embodiments.

FIG. 2 illustrates an example of a type of information 204 that could be displayed to the user via a display screen 202 of a computing device 200 in accordance with various embodiments. In this example, the image captured by the user has been analyzed and related information 204 is displayed on the screen. The "related" information as discussed elsewhere herein can include any information related to an object, item, product, or other element that is matched (within at least a level of confidence) to the image data using one or more matching or identifying algorithms, or other such approaches. These can include, for example, image recognition algorithms, object identification algorithms, facial recognition algorithms, or any other such approaches or techniques. The displayed information in this example includes the title of the located book, an image of the book (as captured by the user or otherwise obtained), pricing and description information, and review information. Also as shown are options to purchase the book, as well as options for various other versions or forms of that content, such as a paperback book or digital download. The type of information displayed (or otherwise conveyed) can depend at least in part upon the type of content located or matched. For example, a located book might include author and title information, as well as formats in which the book is available. For facial recognition, the information might include name, title, and contact information. Various other types of information can be displayed as well within the scope of the various embodiments.

Figure 3:
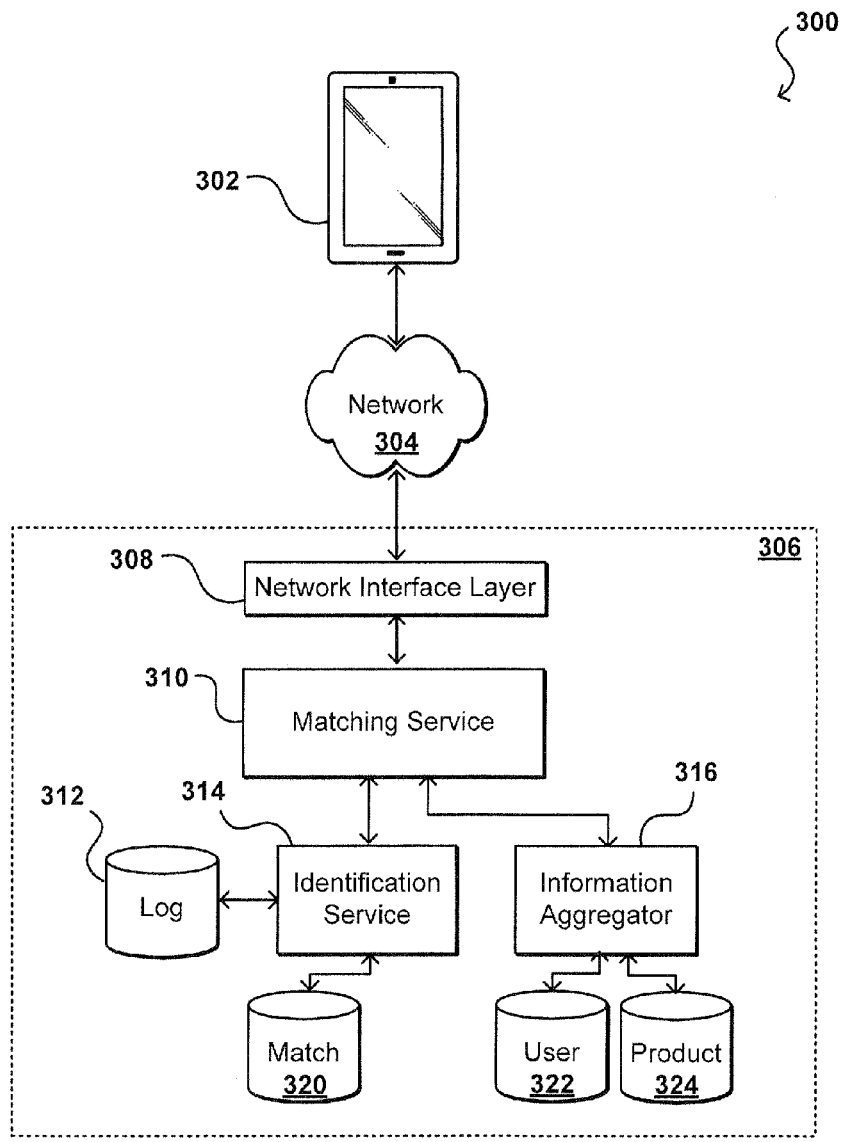
FIG. 3 illustrates example system for identifying items and providing information about those items that can be utilized in accordance with various embodiments.

As discussed, information such as that illustrated in FIG. 2 can be located by streaming (or otherwise transferring) an image, video, and/or other electronic data to a system or service operable to find one or more potential matches for that data and provide related information for those potential matches. FIG. 3 illustrates an example environment 300 in which such information can be located and transferred in accordance with various embodiments. In this example, a user is able to capture one or more types of information using at least one computing device 302. For example, a user can cause a device to capture audio and/or video information around the device, and can send at least a portion of that audio and/or video information across at least one appropriate network 304 to attempt to obtain information for one or more objects, persons, or occurrences within a field of view of the device. The network 304 can be any appropriate network, such as may include the Internet, a local area network (LAN), a cellular network, and the like. The request can be sent to an appropriate content provider 306, as may provide one or more services, systems, or applications for processing such requests. The information can be sent by streaming or otherwise transmitting data as soon as it is obtained and/or ready for transmission, or can be sent in batches or through periodic communications. In some embodiments, the computing device can invoke a service when a sufficient amount of image data is obtained in order to obtain a set of results. In other embodiments, image data can be streamed or otherwise transmitted as quickly as possible in order to provide near real-time results to a user of the computing device.

In this example, the request is received to a network interface layer 308 of the content provider 306. The network interface layer can include any appropriate components known or used to receive requests from across a network, such as may include one or more application programming interfaces (APIs) or other such interfaces for receiving such requests. The network interface layer 308 might be owned and operated by the provider, or leveraged by the provider as part of a shared resource or "cloud" offering. The network interface layer can receive and analyze the request, and cause at least a portion of the information in the request to be directed to an appropriate system or service, such as a matching service 310 as illustrated in FIG. 3. A matching service in this example includes components operable to receive image data about an object, analyze the image data, and return information relating to people, products, places, or things that are determined to match objects in that image data.

The matching service 310 in this example can cause information to be sent to at least one identification service 314, device, system, or module that is operable to analyze the image data and attempt to locate one or more matches for objects reflected in the image data. In at least some embodiments, an identification service 314 will process the received data, such as to extract points of interest or unique features in a captured image, for example, then compare the processed data against data stored in a matching data store 320 or other such location. In other embodiments, the unique feature points, image histograms, or other such information about an image can be generated on the device and uploaded to the matching service, such that the identification service can use the processed image information to perform the match without a separate image analysis and feature extraction process. Certain embodiments can support both options, among others. The data in an image matching data store 320 might be indexed and/or processed to facilitate with matching, as is known for such purposes. For example, the data store might include a set of histograms or feature vectors instead of a copy of the images to be used for matching, which can increase the speed and lower the processing requirements of the matching. Approaches for generating image information to use for image matching are well known in the art and as such will not be discussed herein in detail.

The matching service 310 can receive information from each contacted identification service 314 as to whether one or more matches could be found with at least a threshold level of confidence, for example, and can receive any appropriate information for a located potential match. The information from each identification service can be analyzed and/or processed by one or more applications of the matching service, such as to determine data useful in obtaining information for each of the potential matches to provide to the user. For example, a matching service might receive bar codes, product identifiers, or any other types of data from the identification service(s), and might process that data to be provided to a service such as an information aggregator service 316 that is capable of locating descriptions or other content related to the located potential matches.

In at least some embodiments, an information aggregator might be associated with an entity that provides an electronic marketplace, or otherwise provides items or content for consumption (e.g., purchase, rent, lease, or download) by various customers. Although products and electronic commerce are presented in this and other examples presented, it should be understood that these are merely examples and that approaches presented in the present disclosure can relate to any appropriate types of objects or information as discussed and suggested elsewhere herein. In such an instance, the information aggregator service 316 can utilize the aggregated data from the matching service 310 to attempt to locate products, in a product data store 324 or other such location, which are offered through the marketplace and that match, or are otherwise related to, the potential match information. For example, if the identification service identifies a book in the captured image or video data, the information aggregator can attempt to determine whether there are any versions of that book (physical or electronic) offered through the marketplace, or at least for which information is available through the marketplace. In at least some embodiments, the information aggregator can utilize one or more suggestion algorithms or other such approaches to attempt to determine related elements that might be of interest based on the determined matches, such as a movie or audio tape version of a book. In some embodiments, the information aggregator can return various types of data (or metadata) to the environmental information service, as may include title information, availability, reviews, and the like. For facial recognition applications, a data aggregator might instead be used that provides data from one or more social networking sites, professional data services, or other such entities. In other embodiments, the information aggregator might instead return information such as a product identifier, uniform resource locator (URL), or other such digital entity enabling a browser or other interface on the client device 302 to obtain information for one or more products, etc. The information aggregator can also utilize the aggregated data to obtain various other types of data as well. Information for located matches also can be stored in a user data store 322 of other such location, which can be used to assist in determining future potential matches or suggestions that might be of interest to the user. Various other types of information can be returned as well within the scope of the various embodiments.

The matching service 310 can bundle at least a portion of the information for the potential matches to send to the client as part of one or more messages or responses to the original request. In some embodiments, the information from the identification services might arrive at different times, as different types of information might take longer to analyze, etc. In these cases, the matching service might send multiple messages to the client device as the information becomes available. The potential matches located by the various identification services can be written to a log data store 312 or other such location in order to assist with future matches or suggestions, as well as to help rate a performance of a given identification service. As should be understood, each service can include one or more computing components, such as at least one server, as well as other components known for providing services, as may include one or more APIs, data storage, and other appropriate hardware and software components.

It should be understood that, although the identification services are shown to be part of the provider environment 306 in FIG. 3, that one or more of these identification services might be operated by third parties that offer these services to the provider. For example, an electronic retailer might offer an application that can be installed on a computing device for identifying music or movies for purchase. When a user transfers a video clip, for example, the provider could forward this information to a third party who has software that specializes in identifying objects from video clips. The provider could then match the results from the third party with items from the retailer's electronic catalog in order to return the intended results to the user as one or more digital entities, or references to something that exists in the digital world. In some embodiments, the third party identification service can be configured to return a digital entity for each match, which might be the same or a digital different digital entity than will be provided by the matching service to the client device 302.

As mentioned, however, the information used for image matching typically corresponds to an image of an object taken from a particular orientation. While image matching algorithms can attempt to account for a small amount of deviation in orientation, it will be unlikely that an image of a coffee table taken from the top will be able to match stored information for that coffee table where that information corresponds to an image taken from the side of the coffee table, as the unique features of the side of the table will generally not be present in a top view of the table. On the other hand, if a system is able to identify the table as a coffee table and determine information such as the type of wood or finish, as well as various styling or design information, there might be enough information present to at least determine a type of object and locate one or more similar items. Depending at least in part upon the user's intent, a similarity match might be desirable in at least some embodiments.

Figure 4A:
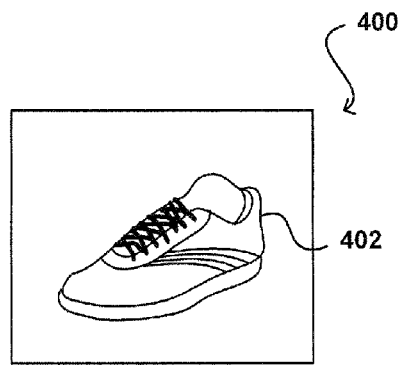
FIGS. 4(a), 4(b), 4(c), 4(d), 4(e), and 4(f) illustrate example images of objects that can be captured and analyzed in accordance with various embodiments.
Figure 4B:
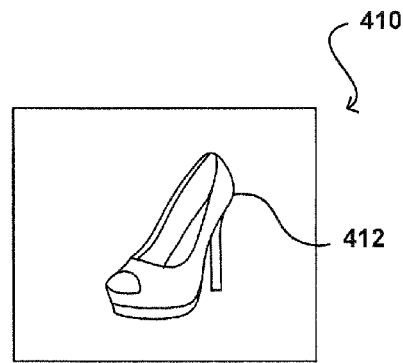

Further, there can be various shapes and sizes of items of the same or similar types, and certain types of item might be deformable as well. As an example, FIG. 4(a) illustrates an example image 400 of a shoe 402 that can be captured and utilized in accordance with various embodiments. The shoe is shown with a particular orientation, as may be used by an electronic retailer or other such provider to display objects in an electronic marketplace. Such an orientation also can be used for matching, as the perspective view provides information about the general shape of the object, and shoes the side and tongue of the shoe, which are likely places for any logo or distinctive markings. FIG. 4(b) illustrates another example image 410 showing a different shoe with substantially the same orientation. An image, feature, contour, or other such matching algorithm can analyze such an image and determine with relative certainty that shoes 402, 412 in the two images 402, 412 are not the same. As will be discussed later herein, however, those shoes 402, 412 have significantly different shapes, which can affect accuracy of orientation and scale determination among other such features when attempting to capture an appropriate image.

Figure 4C:
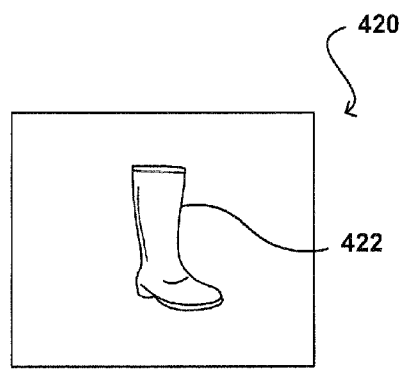
Figure 4D:
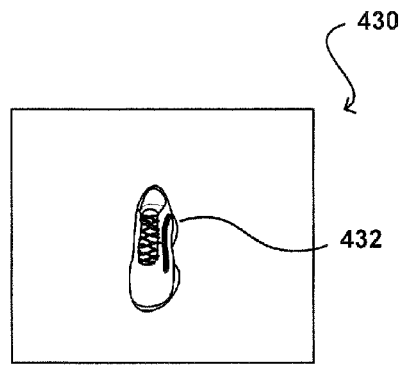
Figure 4E:
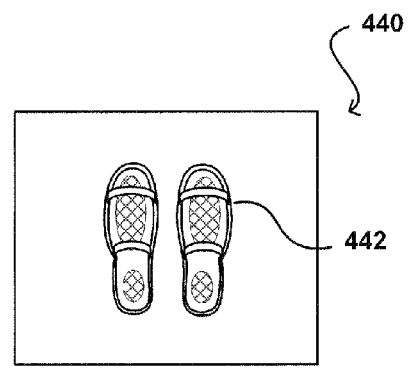
Figure 4F:
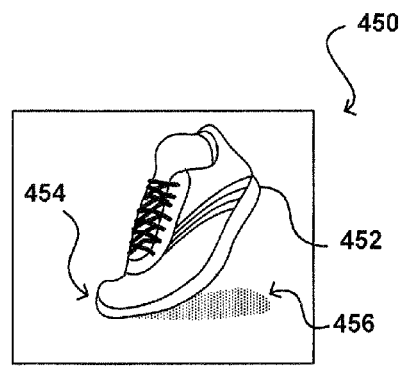

Various complications can arise, however, when users capture images from different orientations. For example, FIG. 4(c) illustrates an example image 420 of a boot 422 that can be captured in accordance with various embodiments. Even though a user might think the orientation is appropriate, unless the algorithm or matching service has a way to determine that the boot image is mirrored with respect to the normal orientation of FIG. 4(a), the algorithm might not be able to find a match even if there is matching information for that boot (or a similar boot). Further, the size of the boot can be significantly different than that of a shoe, such that a different scale image or distance might be needed for the matching, but the user would generally have no way of knowing this information. FIG. 4(d) shows another image 430 of a shoe 432 that can be captured in accordance with various embodiments. As can be seen, the orientation is significantly different than the standard orientation of FIG. 4(a). Due to the different orientation, a matching algorithm might not even be able to identify this object as a shoe, let alone determine the particular style. A user might be tempted to take such an image if the user sees a person wearing those shoes or sees them in a display window, without knowing that the matching algorithms may not be able to match objects from that orientation. A similar issue can arise with the shoes 442 of the image 440 of FIG. 4(e), in that there are two shoes taken from an orientation similar to how the user would actually wear the shoes. An algorithm might not be able to recognize either object as a shoe, and may or may not be able to determine that these are two related objects that correspond to a single item. A user might take such a view when attempting to locate information about the shoes the user is wearing, for example. Yet another issue is illustrated in FIG. 4(f). In this image 450, the shoe 452 is bent such that at least a portion 454 of the shoe has a different shape from a standard shape. Such variation can create difficulties with a matching process. Further, although algorithms can attempt to account for variations in lighting and other such factors, additional objects in the image such as shadows 456, stickers, writing, and the like can potentially affect the matching process by changing the determined shape, coloration, texture, or other such aspect of the object.

A matching service could obtain and analyze multiple images of each object to be matched, which could include images taken from the top, bottom, each side, and various angles with respect to an object, as well as differently shaped states of the object (where possible). Such an approach can greatly increase the amount of image processing, data storage, and image comparison that must be performed, however, and can be very time consuming, such that the approach can be at least impractical for many providers.

Figures 5A, 5B, 5C:
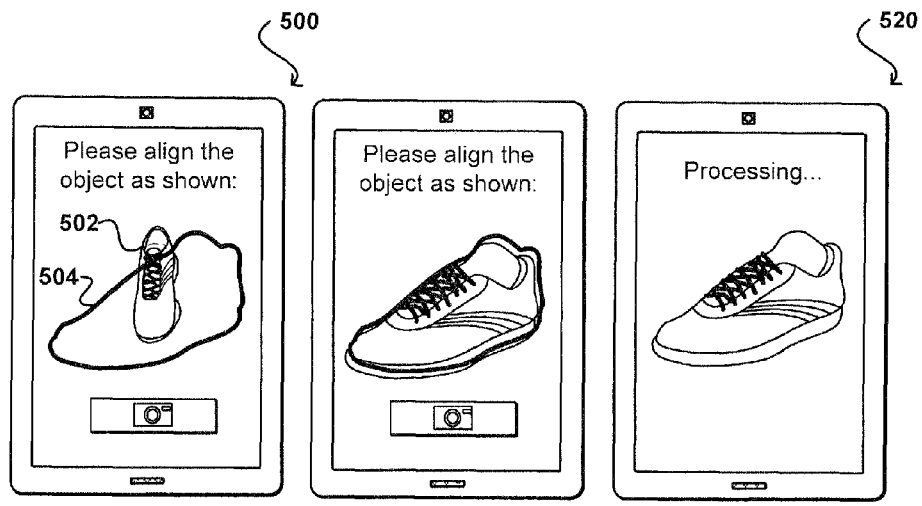
FIGS. 5(a), 5(b), and 5(c) illustrate an example approach to guiding a user to capture an image of an object from a certain orientation and with a certain scale that can be used in accordance with various embodiments.

Approaches in accordance with various embodiments instead attempt to guide or assist the user in capturing image information in a way that improves the likelihood of a matching process being able to determine one or more potential matches. For example, FIG. 5(a) illustrates an example state 500 of a computing device wherein the user is capturing image (e.g., video) information of a shoe 502 and the image information is concurrently displayed on a display screen of the computing device. As illustrated, the image information shows the shoe in a front/top view, which would likely not be able to be successfully matched to a library of shoe images taken from a particular side of each shoe.

In this example, however, the computing device is configured to provide an orientation guide 504 to assist the user in properly orienting the camera of the computing device with respect to the shoe. In this particular example, the orientation guide takes the form of a graphical outline of a shoe, although various graphical, video, and/or animated elements could be provided to assist with orientation in accordance with the various embodiments. Further, the graphical orientation guide might not take the form of the type of object being image in various embodiments, instead providing information about a general orientation and scale, or other such information.

In FIG. 5(a), it can be seen from the orientation guide 504 that the shoe has a non-optimal orientation in the image, and is further away from the device than desired such that the shoe size is about half what is suggested. While at least some variation in scale can be handled by the image analysis algorithms and matching algorithms, the image should be of sufficient size to show the necessary level of detail and the object should not be so close that only a portion of the object is shown in the image, which might prevent a successful match from being located. By viewing information for the current field of view of the camera and the orientation guide at the same time, the user can determine that the user needs to get closer to the shoe and either move the camera or the shoe in order to provide the suggested orientation. After making the necessary adjustments, the shoe 502 can be substantially aligned with the orientation guide, as illustrated in FIG. 5(b). When the user is satisfied that the object has an appropriate orientation per the orientation guide, the user can select an element or button, squeeze the device, make a gesture, or perform another such action to cause an image to be captured and processed, such as illustrated by the state 520 of the device in FIG. 5(c). As mentioned elsewhere herein, however, the device might continually capture and analyze information such that the user does not have to manually cause an image to be captured. Similarly, an algorithm might be executing on the device such that when an object is determined to substantially match the shape and size of the orientation guide, the device can automatically cause an image to be captured. As can be seen in FIG. 5(c), the shoe is in substantially the desired orientation, and it can be much more likely to find a match for the image of FIG. 5(c) than if the image had been captured with the orientation of the shoe in FIG. 5(a).

The type of orientation guide to display can be determined in a number of different ways. For example, a user might navigate to a particular category or type of item before attempting to capture image information. In some embodiments, the user might use an application that is specific to a type of item, such as an application relating to shoes or clothing. In some embodiments, a user might enter a search query or term that can be used to determine an appropriate category or type of item. In some embodiments, current contextual information might be used to determine an appropriate type of orientation guide. For example, if a global positioning system (GPS) or other location-determining component of the computing device provides information enabling the device to determine that the computing device is in a shoe store, the device can display a default shoe-related orientation guide. Similarly, if the device is in a bicycle shop and is able to determine from a wireless network connection or other such mechanism that the device is in a bicycle shop, the device can load a default bicycle orientation guide. The user also can provide input for a type of device or category using any approach known or used to provide information to a computing device, as may include text entry, gesture or motion entry, voice commands, and the like. In some embodiments, the device might automatically capture and analyze image information about its surroundings to attempt to identify one or more types of object nearby, which the device can use to select an appropriate orientation guide.

Figures 6A, 6B:
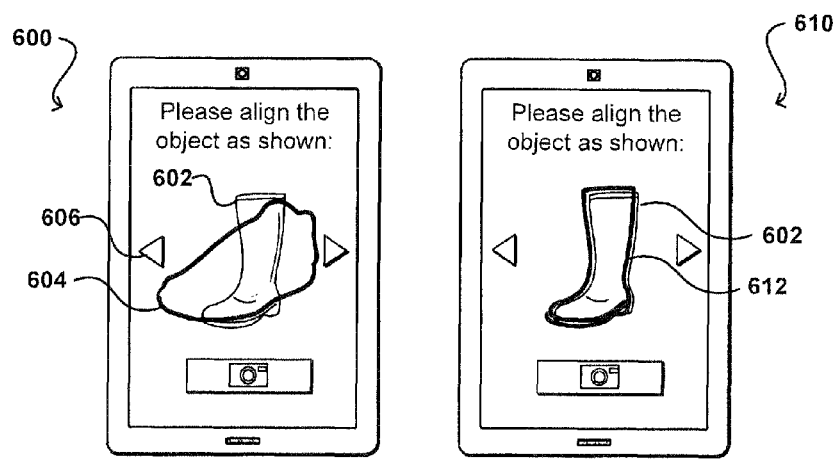
FIGS. 6(a) and 6(b) illustrate an example approach to determining an appropriate orientation guide that can be used in accordance with various embodiments.

In at least some embodiments, an application executing on the device (or in communication with the device) might select a set of group of orientation guides that can be presented to the user to assist the user in capturing information useful for image-based matching. For example, a device determining that the user is likely interested in shoes might load a set of templates containing different shoe outlines, such as outlines for basic shoes, boots, heels, sandals, and the like. The device then can attempt to match these outlines to the shape of an object being imaged by the device, or the user can manually select an appropriate outline. FIG. 6(a) illustrates an example state 600 of a device in accordance with at least one embodiment, wherein the user is capturing an image of a type of shoe 602 that does not match the default orientation guide 604 for the shoe category. In this example, the user is able to select an element 606, make a swipe motion, or perform another such action that enables the user to scroll or cycle through various orientation guides for the shoe category until the user locates the orientation guide that is most like the object being imaged, or at least provides the most guidance with respect to direction and scale. As discussed previously, a shoe outline 604 may not provide enough guidance for a user capturing an image of a boot 602, as the user might not be sure whether to make the size of the whole boot match the size of the shoe outline, or just the "foot" portion of the boot, such that the overall boot might be substantially larger in the image than the outline. In this example, the user is able to scroll through the outlines until the user finds a boot outline 612, as illustrated in the example state 610 of FIG. 6(b). Even though for objects such as shoes the user can likely determine a reasonable direction based on the orientation guide, displaying an appropriate orientation guide can help the user to determine a reasonable scale as well. In some cases, a system might automatically extract a possible outline for what it guesses is the object to be identified, and use the pre-stored outline that most closely matches this extracted outline as the first outline to show the user. The system may also be able to determine the orientation of the object based on the outline, or some other visual cues, and give the user explicit instructions on how to reorient the device relative to the object in order to get the proper image for identification.

While having the proper orientation guide might not seem critical for shoes, choosing the correct outline for a type of shoe can significantly decrease the burden on the identification service and improve the quality of the results. Further, although any shoe outline can arguably provide a primary direction and at least some sense of scale, there are various other categories where determining an appropriate outline can be more important. For example, a "tools" category might have outlines for everything from thumbtacks to chainsaws to drill presses. Even a sub-category such as "saws" might have hand saws, circular saws, and band saws, which each can have significantly different sizes and shapes. Thus, it can be more important for certain categories of items to select the appropriate orientation guide. Further, there might be multiple sub-categories for a type of item and it can be desirable for at least some embodiments to enable the user to select an appropriate sub-category in order to enable the device to provide a set of orientation guides that are closer to the actual type of object.

In some embodiments, a user might open a search tool or application and enter one or more terms relating to the type of object, such as "running shoe" or "pool table." The search tool can present a list of search results to the user, which might include hundreds or thousands of results. The search tool might also recognize that those query terms relate to an object that is, or might be, in the catalog of images available for matching. In at least some cases, the tool can display a camera icon or other such indicator to notify the user that capturing an image of the item can help provide more accurate results. If the customer selects that icon in at least some embodiments, a live video display of a camera view of the device can be activated. As discussed, an outline or other orientation guide for a type of object associated with the query term(s) also can be displayed over the live feed, such that the customer can determine how to best position the camera with respect to the object. Conventional or similar object recognition technology then can be used to identify the object shown in the captured image information. The customer can also be presented with other options, such as to purchase the type of object, place the type of object on a wish list, post information about that object to a social network, and the like. Such an approach enables the user to find accurate results without having to wade through all the query-based search results or enter in additional search criteria. Such an approach also helps mitigate the limitations of conventional planar-surface matching algorithms and other such approaches by prompting the customer to capture images of items from a specific distance and in a specific orientation for those algorithms. Such an approach also takes advantage of the fact that humans are often better than computers at general object categorization, while computer vision is often better at identifying subtle differences between similar objects.

Figure 7A:
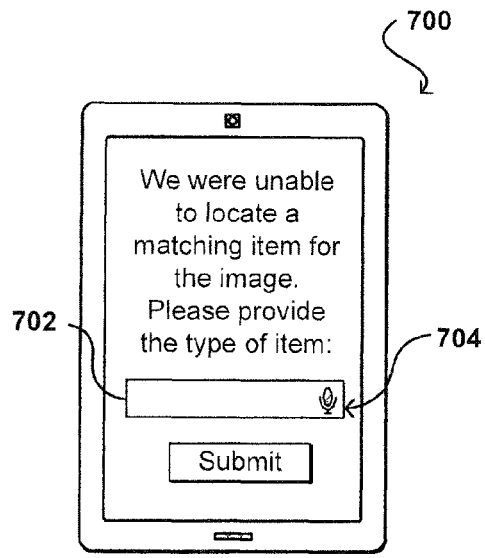
FIGS. 7(a), 7(b), 7(c), and 7(d) illustrate an example approach to obtaining additional information from a user to assist in a matching process in accordance with various embodiments.
Figure 7B:
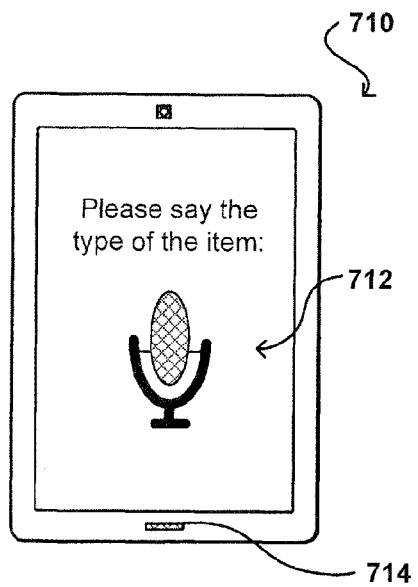
Figure 7C:
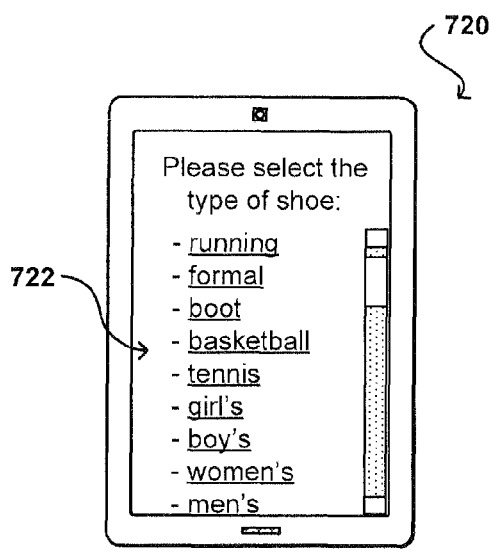
Figure 7D:
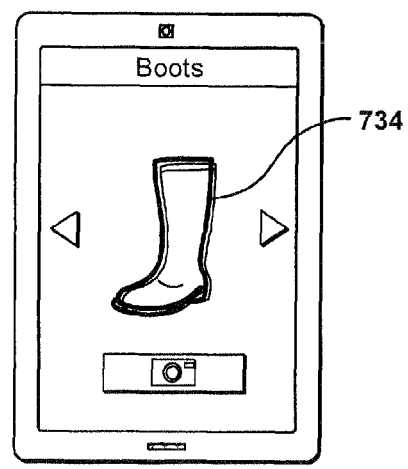

In some embodiments the user can navigate to the appropriate sub-category before attempting to capture an image. In many cases, however, the user either will not know the proper sub-category or might not like having to go through a number of steps before capturing an image. Approaches in accordance with various embodiments can attempt to analyze images using information that is available, and then prompt the user for additional information when needed. For example, FIG. 7(a) illustrates an example state 700 of a computing device when an application or service is unable to locate appropriate match results for captured image information in accordance with at least one embodiment. In this example, a message is displayed to the user indicating that sufficient match information could not be found. The device can then prompt the user to provide additional information. In this example the interface displays a prompt for a type of the item being imaged, but various types of information can be requested that can help to assist in the matching or analysis process. The user can provide the information in a number of different ways. For example, in FIG. 7(a) there is a text box 702 that the user can use to type in the information. Similarly, there is an icon 704 indicating that the user can provide the information through voice input using approaches known or used for such purposes. In some embodiments, a user must select the icon to activate voice input, to be taken to a state 710 such as that illustrated in FIG. 7(b), where graphical information 712 or other indicators can be provided to indicate to the user that voice input is active and that the user should speak the input to be detected by a microphone 714 or other audio capture element of the device. Voice recognition or another such process then can be used to determine the input using various algorithms used for such purposes. Various other approaches can be used as well, such as are used for determining various sub-categories or aspects of various types of information. For example, as illustrated in the state 720 of FIG. 7(c) and FIG. 7(d), the user can select a sub-category or type of item from a scrollable list 722, or perform another such action. The device can then attempt to provide information for a match 734 based on each instance of additional information, upon receiving a set of requested information, or at any other appropriate time. Additional requests can be utilized if sufficient matches still cannot be found, although a limit on the number of prompts might be utilize in order to avoid annoying the user or otherwise degrading the user experience.

In at least some embodiments a user can be instructed to pan the camera around at least a portion of an object in order to provide a number of different views of the object. Such an approach can be useful when, for example, an appropriate orientation guide is not available, sufficient match results are unable to be obtained, or additional information is otherwise unable to be obtained. For example, a user might be viewing a shoe in a store window and unable to obtain the desired orientation as indicated by the orientation guide. In such a case, the user can have the option and/or ability to pan the camera and capture video and/or a series of images showing multiple views of the object. Such information can improve the ability of a matching process to match at least one of the views, and in at least some embodiments at least a portion of a three-dimensional model can be generated that can be used to attempt to determine the type of object for use in narrowing the search field. If the camera has a gyroscope, inertial sensor, GPS, or other such position, motion, and/or orientation-determining sensor, the device also can provide position information with the panned image information that can help to determine scale. Various other components such as stereo cameras or distance sensors can help to determine scale as well in accordance with various embodiments, which can help to provide more accurate results. In some embodiments, three-dimensional models of various objects might also be stored that can be matched against the panned image information.

Figure 8A:
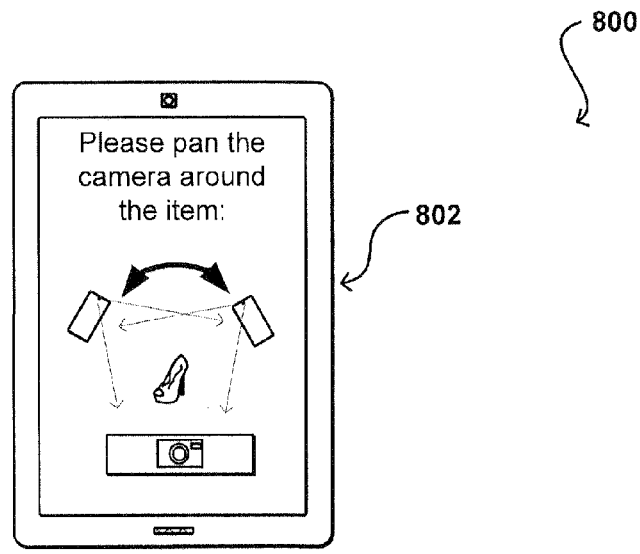
FIGS. 8(a) and 8(b) illustrate an example approach to guiding a user to capture image information over a range of viewing angles that can be used in accordance with various embodiments.
Figure 8B:
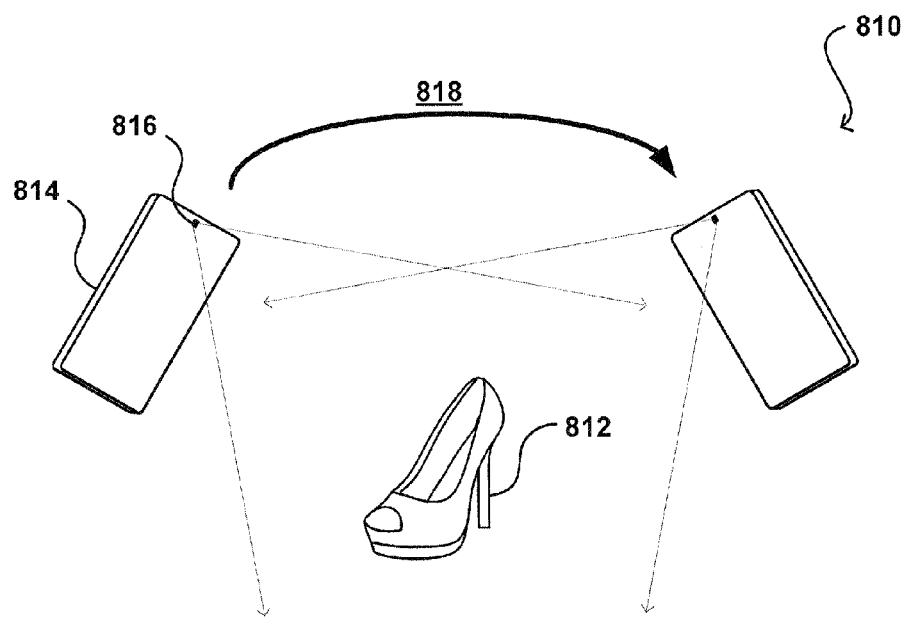

In the example situation 800 of FIG. 8(a), instructions 802 are provided to a user, prompting the user to pan the camera around the object with at least a certain angular range or motion. The instructions can include an image, animation, video, text, audio, and/or other such forms of communication. In at least some embodiments, the user can select a capture option or element at the beginning and the end of the motion in order to capture video or a series of images. In other embodiments, the device might continually capture image information such that the user need not select any such element or option. Various other approaches can be used as well. As illustrated in the situation 810 of FIG. 8(b), the user can position a camera 816 of a computing device 814 such that a field of view of the camera contains the object of interest 812 from a first angle. The user can then move the computing device 814 at least partially around the object 812 while keeping the object within the field of view of the camera 816, such as by following the illustrated trajectory 818. Various other trajectories can be used as well as should be apparent in light of the present disclosure. The captured image information can be uploaded at the end of the motion or during the motion, or can be processed on the device with information about the captured images or video being uploaded for analysis. It should be understood, however, that in at least some embodiments some or all of the matching can be done on the device itself, such as where the device stores or has access to the matching information.

Figure 9:
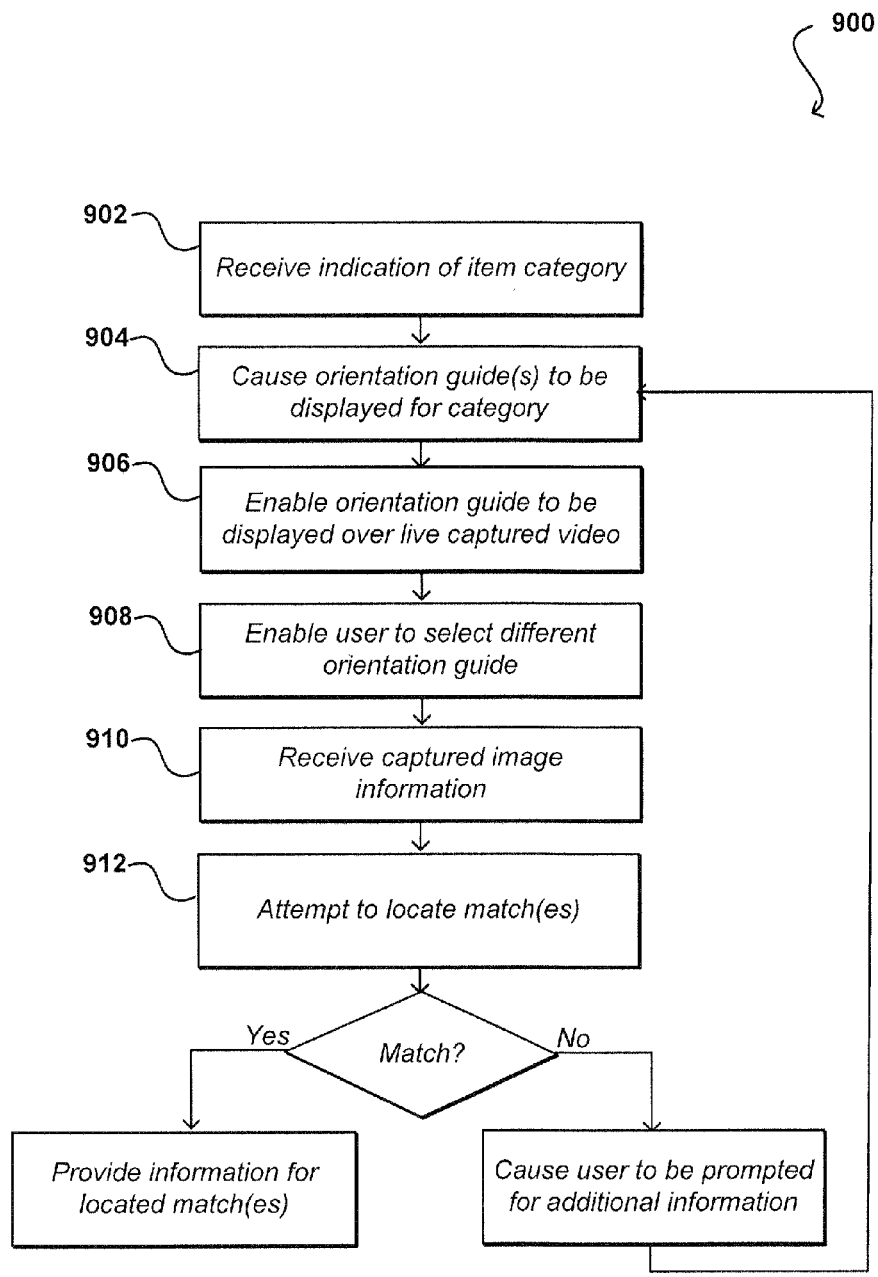
FIG. 9 illustrates an example process for determining information about an object imaged by a user that can be utilized in accordance with various embodiments.

FIG. 9 illustrates an example process 900 for locating matches for object in captured image data that can be utilized in accordance with various embodiments. It should be understood that there can be additional, fewer, or alternative steps performed in similar or alternative orders, or in parallel, within the scope of the various embodiments unless otherwise stated. In this example, an object identification process or application is activated on a computing device. The identification process can be activated manually by a user, such as by the user opening an application, or automatically by the device in response to a detected motion, location, or other such trigger. In other embodiments, object identification might be active during various states of the device, such as an awake state, a standby state, and the like. As part of the object identification process, an indication of a category or type of item, or other such information, will be received 902 or otherwise obtained by the device. As discussed, this indication can be the result of a user selecting or inputting a category or type, a user entering a search term for a type of item in a search tool, a user navigating to a specific page or section of an interface related to that type of item, or the computing device determining a likely type of item based on location, surrounding items, or other such information. Various other indications can be utilized as well. In situations where the user does not provide guidance and specific contextual information cannot be obtained, a default or last-used category might be used as a starting point.

In response to determining information such as a type or category of object of interest, at least one orientation guide can be caused 904 to be displayed to the user via the computing device. In at least some embodiments, this can involve displaying a graphical element on a display screen of the computing device, where the graphical element provides guidance as to a relative orientation of the object that may be more likely to be successful in the matching process. In at least some embodiments, the orientation guide can take the form of a graphical outline or partially-transparent view of the type of object from a particular point of view and with a certain size or scale that is optimal (or at least useful) for matching against images of that type of object. Various other types of orientation guide can be used as well as discussed elsewhere herein. Any relevant image information captured by a camera of the computing device can be enabled 906 to be displayed to the user with a currently selected orientation guide. By being able to view the image information and orientation guide together, in at least this embodiment, the user is able to move the relative position of the camera to the object (through movement of the camera and/or object) in order to cause the object to have a substantially similar orientation and scale in the field of view of the camera. The user also can be enabled 908 to select a different orientation guide if the currently selected guide is not appropriate, for example, such as where the guide is for a different type of item or the orientation of the guide is not possible given the current environment. The user can have other options as well, such as to flip or rotate the outline, with information about the action being used for subsequent processing of the captured image. As discussed, this can involve selecting from a menu, scrolling through options, or performing another such action. The user can continue to reorient the camera, adjust the selected orientation guide, or perform other such actions until the user is satisfied that the object is represented in the field of view of the camera in a way that will likely produce a successful match.

When the user is satisfied with the orientation, or at another appropriate time, the user can cause image information to be captured which can be received 910 for analysis. As discussed, the image information can be captured manually or automatically, and the image information can be analyzed on the device and/or a remote system or service. An attempt can then be made 912 to match the image information, or data about the image information, against stored image information. As discussed, this can involve an image-to-image comparison, a histogram or feature vector comparison, or any other such process known or used for image matching. Also as discussed, selecting an appropriate outline can help to narrow the search space, in order to improve accuracy and increase the speed at which results can be obtained. For example, a user selecting an outline for running shoes can eliminate all non-shoe objects from matching consideration, and can further reduce the search space to a specific type of shoe. If at least one match is able to be found 914, information about the match can be provided 916 to the user. For example, information about a type of object contained in the image can be transmitted for display on a display screen of the computing device. If at least one match cannot be found with an acceptable level of confidence or other such metric, or if the results otherwise do not meet some predetermined criteria, the device can be caused 918 to prompt the user for additional information, such as a category, sub-category, type, or other such information about the object, a distance, a location, or other such information that might be helpful in locating an appropriate match. For example, the user can be prompted for information that can help to narrow the context of the computer vision and/or reduce the search space. The process can continue until an acceptable match is located and/or a user indicates that one of the suggested matches is sufficient. In at least some embodiments, the user will only be prompted for additional information up to a maximum number of times, in order to prevent a degrading of the user experience, etc. As discussed, information for related, similar, or suggested items or objects can be determined and presented as well.

As should be understood to one of ordinary skill in the art, the level of accuracy for a match can vary by category or type of item. For example, a user capturing an image of a compact disc might want information about that specific recording. A user capturing an image of a white t-shirt, however, might not care about the particular brand but may only want to obtain information about white t-shirts with similar attributes. Computer vision might not be able to provide information such as brand and size for a t-shirt being imaged, but such information may not be important to users in at least some cases. Thus, different matching criteria or thresholds might be used for different categories or types of item or object.

The types of object for which the user captures images or otherwise indicates interest can also be stored for use in prioritizing orientation guides. For example, if a user always purchases running shoes and men's formal shoes then orientation guides for those types of shoes might be prioritized for that user over guides for boots or other types of item in that category. Further, the initial search space can be limited in at least some embodiments based on learned user interests and other such information. Default guides for the various categories might update accordingly.

As discussed, such approaches can be used to identify various types of object, not just products or goods. For example, such a process can be used to identify animals, birds, statues, and people, among other such three-dimensional objects. For any situation where the matching utilizes images taken with a particular orientation, guiding the user to capture images with the proper orientation can improve the accuracy and speed of a matching and/or identification process. Further, such approaches can recognize aspects such as the subtle differences between various types of airline part, which can be difficult for humans to discern.

Also as discussed, various technologies can be used to assist with scale determinations as well. For example, a "statue" category with an appropriate outline might result in a similar image being taken of a one foot high statue and a thirty foot tall statue. By using stereoscopic imaging, a distance sensor, or another such component or technology the device can obtain a better determination of scale, which can help to discern between similar objects of different scale.

Figure 10:
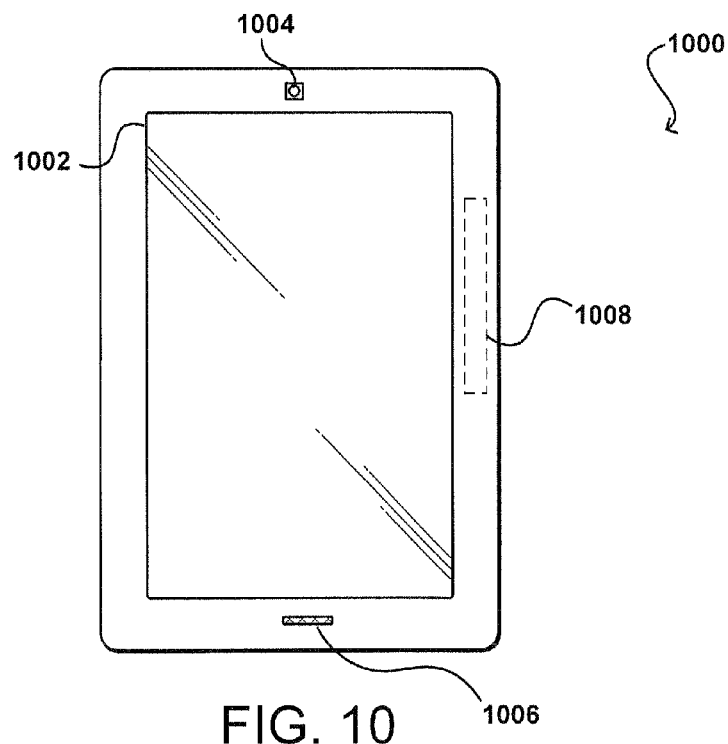
FIG. 10 illustrates an example device that can be used to implement aspects of the various embodiments.

FIG. 10 illustrates an example electronic user device 1000 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 1000 has a display screen 1002 on the front side, which under normal operation will display information to a user facing the display screen (e.g., on the same side of the computing device as the display screen). The computing device in this example includes at least one camera 1004 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 1000 also includes at least one microphone 1006 or other audio capture device capable of capturing audio data, such as words or commands spoken by a user of the device. In this example, a microphone 1006 is placed on the same side of the device as the display screen 1002, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 1000 also includes at least one orientation sensor 1008, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 11:
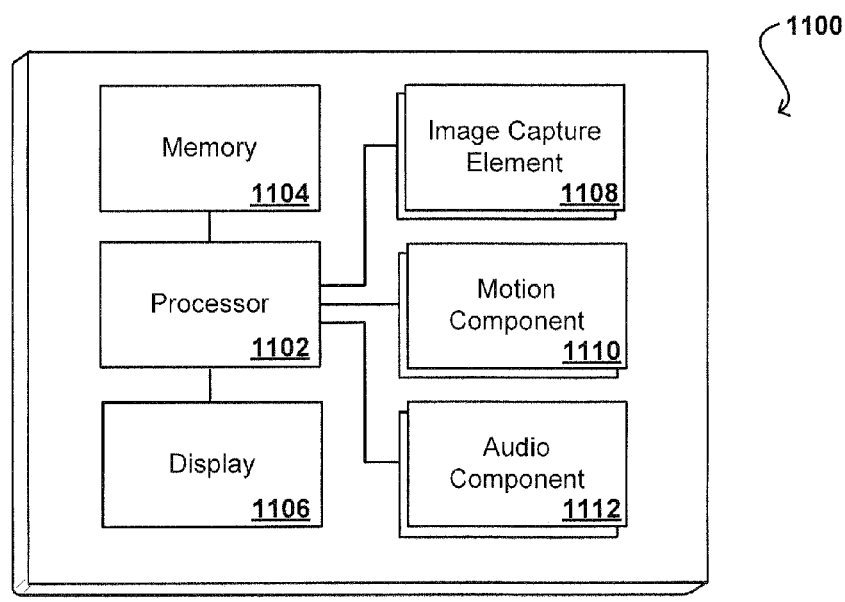
FIG. 11 illustrates example components of a client device such as that illustrated in FIG. 10.

FIG. 11 illustrates a logical arrangement of a set of general components of an example computing device 1100 such as the device 1000 described with respect to FIG. 10. In this example, the device includes a processor 1102 for executing instructions that can be stored in a memory device or element 1104. As would be apparent to one of ordinary skill in the art, the device can include many types of memory, data storage, or non-transitory computer-readable storage media, such as a first data storage for program instructions for execution by the processor 1102, a separate storage for images or data, a removable memory for sharing information with other devices, etc. The device typically will include some type of display element 1106, such as a touch screen or liquid crystal display (LCD), although devices such as portable media players might convey information via other means, such as through audio speakers. As discussed, the device in many embodiments will include at least one image capture element 1108 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 1112, such as a mono or stereo microphone or microphone array, operable to capture audio information from at least one primary direction. A microphone can be a uni-or omni-directional microphone as known for such devices.

In some embodiments, the computing device 1100 of FIG. 11 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 1100 also can include at least one orientation or motion sensor 1110. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 1102, whereby the device can perform any of a number of actions described or suggested herein.

As an example, a computing device such as that described with respect to FIG. 10 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 12:
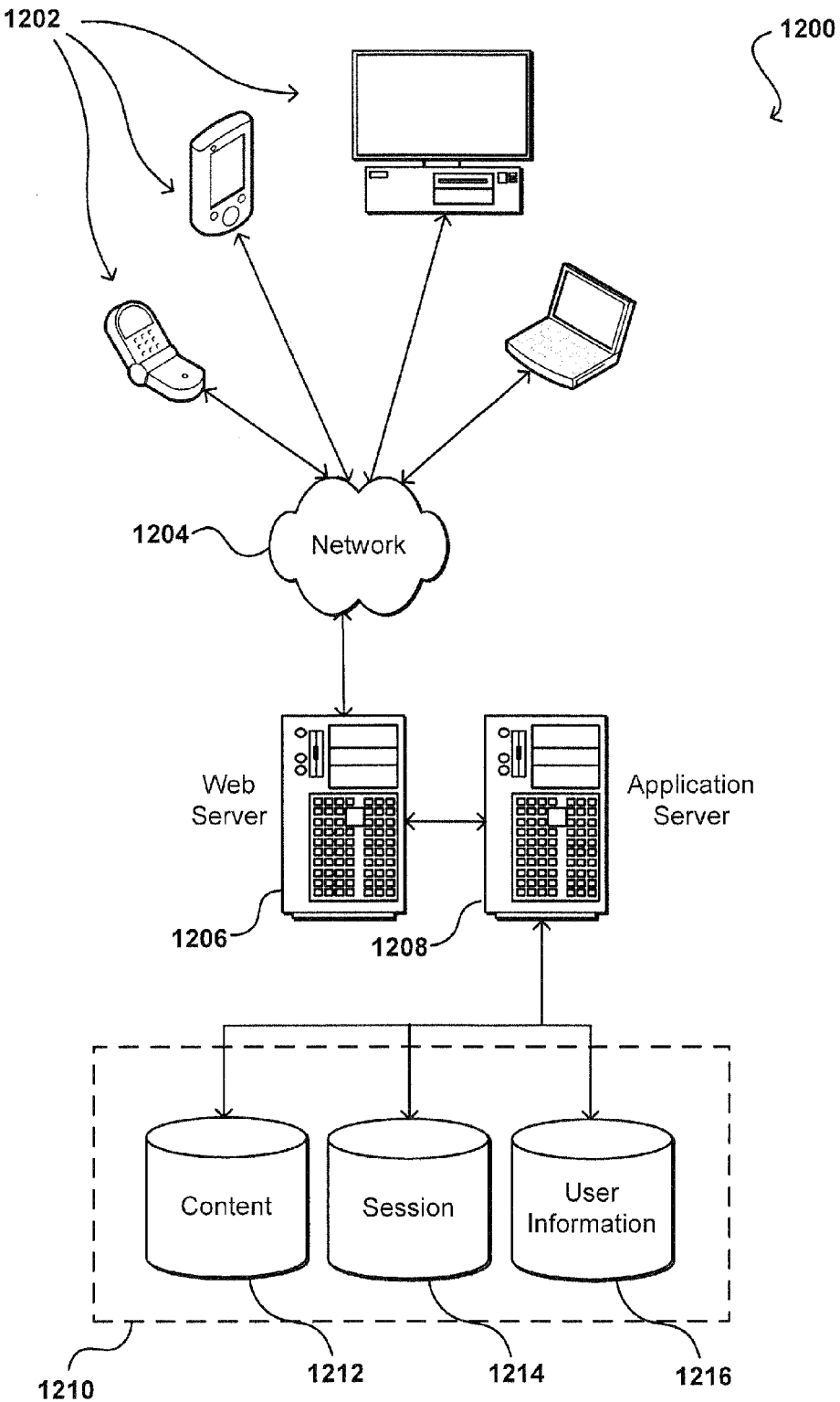
FIG. 12 illustrates an environment in which various embodiments can be implemented.

As discussed, different approaches can be implemented in various environments in accordance with the described embodiments. For example, FIG. 12 illustrates an example of an environment 1200 for implementing aspects in accordance with various embodiments. As will be appreciated, although a Web-based environment is used for purposes of explanation, different environments may be used, as appropriate, to implement various embodiments. The system includes an electronic client device 1202, which can include any appropriate device operable to send and receive requests, messages or information over an appropriate network 1204 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1206 for receiving requests and serving content in response thereto, although for other networks an alternative device serving a similar purpose could be used, as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1202 and the application server 1208, can be handled by the Web server 1206. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 1202. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   at least one processor;
   a camera;
   a display screen; and
   a memory device including instructions that, when executed by the at least one processor, cause the computing device to:
   display image information on the display screen, the image information including a current view of an object as acquired using the camera;
   display a plurality of orientation guides on the display screen;
   cause prompt information to be displayed concurrently with the plurality of orientation guides, the prompt information including a request to a user of the computing device for selecting one of the plurality of orientation guides;
   detect one or more types of input gestures with respect to the displayed prompt information;
   adjust a subset of the plurality of orientation guides based at least in part on the detected one or more types of input gestures;
   receive a selection of at least one adjusted orientation guide of the subset of the plurality of orientation guides;
   cause the selected at least one adjusted orientation guide to be displayed concurrently with the image information on the display screen;
   detect a change in position of the computing device with respect to the object;
   cause an image of the object to be captured by the camera based at least in part on the change in position detected, the image being captured based at least in part on an orientation and size of a representation of the object in the image information being similar to an orientation and size of the selected at least one adjusted orientation guide;
   determine a type of object in a category that corresponds to at least a portion of the representation of the object in the image information; and
   provide identifying information for the object related to the determined type of object in the category.

2. The computing device of claim 1, wherein the instructions further cause the computing device to:
   compare each of the plurality of orientation guides to at least the representation of the object in the image information to determine a match, each of the plurality of orientation guides corresponding to a respective category for a type of object; and
   cause selection of at least one of the plurality of orientation guides determined to match the representation of the object.

3. The computing device of claim 2, wherein the instructions further cause the computing device to:
   obtain a series of images including a plurality of views of the object, the series of images being captured by at least one device sensor of the computing device over a period of time and the object being maintained within a field of view of the computing device, the at least one of the plurality of orientation guides being automatically selected based at least in part on a match between at least one of the plurality of views of the object and the selected at least one of the plurality of orientation guides.

4. The computing device of claim 1, wherein the at least one of the plurality of orientation guides is selected based at least in part on location information of the computing device, the selected at least one of the plurality of orientation guides being related to a particular location as to which the computing device is situated.

5. A computer-implemented method of identifying an object of interest, comprising:
   causing image information to be displayed on a display screen of the computing device, the image information including a current view of an object;
   determining an orientation guide for a category of the object based at least in part on location information of the computing device, the orientation guide being related to a particular location as to which the computing device is situated;
   causing the orientation guide to be displayed concurrently with the image information on the display screen;
   detecting a change in position of the computing device with respect to the object;
   causing an image of the object to be captured based at least in part on the change in position detected, the image being captured based at least in part on an orientation of a representation of the object in the image information being similar to an orientation of the orientation guide; and
   providing identifying information for the object based at least in part on a type of object in a category that corresponds to at least a portion of the representation of the object in the captured image.

6. The computer-implemented method of claim 5, further comprising:
causing orientation information to be displayed on the display screen for instructing a user of the computing device on how to reorient the computing device relative to the object, the orientation information being displayed concurrently with the orientation guide.

7. The computer-implemented method of claim 5, further comprising:
receiving a query on an application of the computing device, the query including one or more query terms relating to the object;
determining search results based at least in part on the received query; and
filtering the search results using the image information of the object captured through the orientation guide.

8. The computer-implemented method of claim 5, further comprising:
determining identification information of one or more types of objects in proximity to the computing device based at least in part on the image information including a current view of a surrounding of the computing device, the orientation guide being determined based at least in part on the identification information of the one or more types of objects in proximity to the computing device.

9. The computer-implemented method of claim 5, further comprising:
causing a plurality of orientation guides to be displayed on the display screen;
causing prompt information to be displayed concurrently with the plurality of orientation guides, the prompt information including a request to a user of the computing device for selecting one of the plurality of orientation guides;
receiving a selection of at least one of the plurality of orientation guides as the determined orientation guide based at least in part on user interaction with the prompt information; and
causing the selected at least one of the plurality of orientation guides to be displayed concurrently with the image information.

10. The computer-implemented method of claim 9, further comprising:
detecting one or more types of input gestures with respect to the displayed prompt information; and
adjusting a subset of the plurality of orientation guides based at least in part on the detected one or more types of input gestures.

11. The computer-implemented method of claim 5, further comprising:
causing a plurality of categories and types of items, for selection by the user of the computing device, to be displayed on the display screen of the computing device;
enabling the user to navigate to a particular category or type of item of the plurality of categories and types of items before the image information is captured; and
receiving a selection by the user of at least one of the particular category and type of item, the orientation guide being determined based at least in part on the received selection.

12. The computer-implemented method of claim 5, further comprising:
determining a plurality of orientation guides that correspond to respective categories for a type of object;
comparing each of the plurality of orientation guides to a representation of the object included in at least the image information to determine a match; and
automatically selecting at least one of the plurality of orientation guides determined to match the representation of the object for display as the determined orientation guide.

13. A non-transitory computer-readable storage medium including instructions, the instructions when executed by at least one processor of a computing device causing the computing device to:
cause image information of a current environment as to which a computing device is situated, captured by a camera of the computing device, to be displayed on a display screen of the computing device, the image information including a current view of the object, the current view capable of changing depending at least in part upon a position of the computing device;
cause an orientation guide for a category of the object to be displayed on the display screen;
cause orientation information to be displayed on the display screen for instructing a user of the computing device on how to reorient the computing device relative to the object, the orientation information being displayed concurrently with the orientation guide;
detect a change in position of the computing device with respect to the object;
cause an image of the object to be captured by the camera based at least in part on the change in position detected, the image being captured based at least in part on an orientation of a representation of the object in the captured image information being similar to an orientation of the orientation guide; and
provide identifying information for the object based at least in part on a type of object in a category that corresponds to at least a portion of the representation of the object in the captured image.

14. The non-transitory computer-readable storage medium of claim 13, wherein the instructions further cause the computing device to:
determine identification information of one or more types of objects in proximity to the computing device based at least in part on the image information of the current environment; and
determine the orientation guide using the identification information of the one or more types of objects in proximity to the computing device.

15. The non-transitory computer-readable storage medium of claim 13, wherein the instructions further cause the computing device to:
determine the orientation guide based at least in part on location information of the computing device, the orientation guide being related to a particular location as to which the computing device is situated.

16. The non-transitory computer-readable storage medium of claim 13, wherein the instructions further cause the computing device to:
cause a plurality of categories and types of items to be displayed for selection by the user of the computing device;
cause a display option to navigate to a particular category or type of item of the plurality of categories and types of items to be displayed before the image information is captured; and
receive a selection by the user of at least one of the particular category and type of item, the orientation guide being determined based at least in part on the received selection.

17. The non-transitory computer-readable storage medium of claim 13, wherein the instructions further cause the computing device to:
  cause a plurality of orientation guides to be displayed on the display screen;
  compare each of the plurality of orientation guides to a representation of the object included in at least the image information to determine a match, each of the plurality of orientation guides corresponding to a respective category for a type of object; and
  automatically select at least one of the plurality of orientation guides determined to match the representation of the object.

18. The non-transitory computer-readable storage medium of claim 17, wherein the instructions further cause the computing device to:
  cause prompt information to be displayed concurrently with the plurality of orientation guides, the prompt information including a request to the user of the computing device for selecting one of the plurality of orientation guides;
  receive a selection of at least one of the plurality of orientation guides based at least in part on user interaction with the prompt information; and
  cause the selected at least one of the plurality of orientation guides to be displayed as the orientation guide for the category of the object.

19. The non-transitory computer-readable storage medium of claim 17, wherein the instructions further cause the computing device to:
  obtain a series of images including a plurality of views of the object, the series of images being captured by the camera of the computing device over a period of time and the object being maintained within a field of view of the computing device, the at least one of the plurality of orientation guides being automatically selected based at least in part on determining at least one of the plurality of views included in the representation of the object that corresponds to the selected at least one of the plurality of orientation guides.

20. The non-transitory computer-readable storage medium of claim 17, wherein the instructions further cause the computing device to:
  cause image information of a current environment as to which the computing device is situated to be captured by the camera; and
  analyze the image information of the current environment to determine identification information of one or more types of objects in proximity to the computing device, the at least one of the plurality of orientation guides being selected based at least in part on the identification information of the one or more types of objects in proximity to the computing device.

* * * * *